United States Patent
Lesartre et al.

(10) Patent No.: US 7,624,213 B2
(45) Date of Patent: Nov. 24, 2009

(54) PASSING IDENTIFICATION INFORMATION

(75) Inventors: Gregg Bernard Lesartre, Ft. Collins, CO (US); Mark Edward Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 11/056,471

(22) Filed: Feb. 11, 2005

(65) Prior Publication Data

US 2006/0184606 A1    Aug. 17, 2006

(51) Int. Cl.
G06F 13/00    (2006.01)
(52) U.S. Cl. .................. 710/104; 710/105; 710/106
(58) Field of Classification Search ............. 710/15–19, 710/29, 61, 100, 104–106, 301–302, 109–110, 710/220; 375/371, 373, 376
See application file for complete search history.

(56) References Cited

U.S. PATENT DOCUMENTS

| | | |
|---|---|---|
| 3,676,859 A | 7/1972 | Hollaway |
| 4,047,159 A | 9/1977 | Boudry |
| 4,332,793 A | 6/1982 | Olson |
| 4,490,788 A | 12/1984 | Rasmussen |
| 4,569,052 A | 2/1986 | Cohn |
| 4,611,614 A | 9/1986 | Schmidt |
| 4,677,614 A | 6/1987 | Circo |
| 4,884,263 A | 11/1989 | Suzuki |
| 5,068,854 A | 11/1991 | Chandran |
| 5,414,830 A | 5/1995 | Marbot |
| 5,487,151 A | 1/1996 | Kikuchi |
| 5,754,789 A | 5/1998 | Nowatzyk |
| 5,790,563 A | 8/1998 | Ramamurthy |
| 5,907,566 A | 5/1999 | Benson |
| 5,956,370 A | 9/1999 | Ducaroir |
| 6,052,812 A | 4/2000 | Chen |
| 6,085,257 A | 7/2000 | Ducaroir |
| 6,092,233 A | 7/2000 | Yang |
| 6,154,870 A | 11/2000 | Fredrickson |
| 6,167,077 A | 12/2000 | Ducaroir |
| 6,173,423 B1 | 1/2001 | Autechaud |
| 6,202,108 B1 | 3/2001 | Autechaud |
| 6,233,073 B1 | 5/2001 | Bowers |
| 6,292,906 B1 | 9/2001 | Fu |

(Continued)

FOREIGN PATENT DOCUMENTS

EP    0 860 778    8/1998

(Continued)

OTHER PUBLICATIONS

InfiniBand Architecture Release 1.0 vol. 2—Physical Specifications, Link/ Phy Interface, InfiniBand Trade Association, p. 98 to 127, Oct. 24, 2000.*

(Continued)

Primary Examiner—Khanh Dang

(57) ABSTRACT

A data communications architecture employing serializers and deserializers that reduces data communications latency. In an illustrative implementation, the data communications architecture communicates data across communications links. The architecture maintains various mechanisms to promote data communications speed and to avoid communication link down time. These mechanisms perform the functions including but not limited to generating processing debug information, processing link identification information, injecting errors across communications links and performing error detection.

30 Claims, 9 Drawing Sheets

U.S. PATENT DOCUMENTS

| | | | |
|---|---|---|---|
| 6,311,239 B1 | 10/2001 | Matthews | |
| 6,313,932 B1 | 11/2001 | Roberts | |
| 6,374,389 B1 | 4/2002 | Tuma | |
| 6,404,739 B1 | 6/2002 | Gonno | |
| 6,449,694 B1 | 9/2002 | Burgess | |
| 6,516,952 B1 | 2/2003 | Wang et al. | |
| 6,556,152 B2 | 4/2003 | Pitio | |
| 6,587,432 B1 | 7/2003 | Putzolu | |
| 6,628,679 B1 | 9/2003 | Talarek | |
| 6,647,428 B1 | 11/2003 | Bannai | |
| 6,653,957 B1* | 11/2003 | Patterson et al. | 341/100 |
| 6,662,332 B1 | 12/2003 | Kimmitt | |
| 6,671,833 B2 | 12/2003 | Pitio | |
| 6,684,351 B1 | 1/2004 | Bendak | |
| 6,690,682 B1 | 2/2004 | Giaretta | |
| 6,738,935 B1 | 5/2004 | Kimmitt | |
| 6,771,671 B1 | 8/2004 | Fields | |
| 6,834,362 B2 | 12/2004 | Nishtala | |
| 6,850,559 B1 | 2/2005 | Driessen | |
| 6,894,969 B1 | 5/2005 | Chidambaran | |
| 6,963,533 B2 | 11/2005 | Kukic | |
| 6,985,502 B2* | 1/2006 | Bunton | 370/535 |
| 6,992,987 B2 | 1/2006 | Kobayashi | |
| 7,010,607 B1* | 3/2006 | Bunton | 709/228 |
| 7,010,612 B1 | 3/2006 | Si | |
| 7,013,419 B2 | 3/2006 | Kagan | |
| 7,016,304 B2 | 3/2006 | Chou | |
| 7,035,294 B2 | 4/2006 | Dove | |
| 7,039,837 B2 | 5/2006 | Martini | |
| 7,046,623 B2 | 5/2006 | Kukic | |
| 7,054,331 B1* | 5/2006 | Susnow et al. | 370/465 |
| 7,058,010 B2 | 6/2006 | Chidambaran | |
| 7,062,568 B1 | 6/2006 | Senevirathne | |
| 7,065,101 B2 | 6/2006 | Ziegler | |
| 7,073,001 B1 | 7/2006 | Kucharewski | |
| 7,082,556 B2 | 7/2006 | Fishman | |
| 7,159,137 B2 | 1/2007 | Nemawarkar | |
| 7,180,867 B2 | 2/2007 | Hoch | |
| 7,200,790 B2 | 4/2007 | Sharma | |
| 7,243,291 B1 | 7/2007 | Williams | |
| 7,251,764 B2 | 7/2007 | Bonneau | |
| 7,269,759 B2 | 9/2007 | Biles | |
| 2002/0001287 A1 | 1/2002 | Bergenwall | |
| 2002/0087921 A1 | 7/2002 | Rodriguez | |
| 2002/0122503 A1 | 9/2002 | Agazzi | |
| 2002/0133762 A1 | 9/2002 | Susnow | |
| 2002/0146876 A1 | 10/2002 | Saruwatari | |
| 2003/0002505 A1 | 1/2003 | Hoch | |
| 2003/0061390 A1 | 3/2003 | Schaller | |
| 2003/0095575 A1* | 5/2003 | Annadurai et al. | 370/516 |
| 2003/0103253 A1* | 6/2003 | Bunton | 359/123 |
| 2003/0112798 A1 | 6/2003 | Ziegler | |
| 2003/0112881 A1* | 6/2003 | Cox et al. | 375/260 |
| 2003/0120852 A1* | 6/2003 | McConnell et al. | 710/316 |
| 2003/0123444 A1 | 7/2003 | Watanabe | |
| 2003/0145134 A1 | 7/2003 | Wehage | |
| 2003/0149922 A1 | 8/2003 | Lai | |
| 2003/0158992 A1 | 8/2003 | Ajanovic | |
| 2003/0189903 A1 | 10/2003 | Hsu | |
| 2003/0210071 A1 | 11/2003 | Fowler | |
| 2003/0226085 A1 | 12/2003 | Tucker | |
| 2004/0071250 A1 | 4/2004 | Bunton | |
| 2004/0083077 A1 | 4/2004 | Baumer | |
| 2004/0103333 A1* | 5/2004 | Martwick et al. | 713/400 |
| 2005/0021823 A1 | 1/2005 | Sharma | |
| 2005/0073586 A1 | 4/2005 | Li et al. | |
| 2005/0076280 A1 | 4/2005 | Martinez | |
| 2005/0081823 A1 | 4/2005 | Muto | |
| 2005/0108458 A1* | 5/2005 | Vogt | 711/1 |
| 2005/0149705 A1* | 7/2005 | Gupta et al. | 712/227 |

FOREIGN PATENT DOCUMENTS

| | | |
|---|---|---|
| JP | 01205946 | 8/1989 |

OTHER PUBLICATIONS

All SPI- 4s Are Not Created Equal, By Mike Berry, Silicon Logic Engineering, Feb. 20, 2003.*
IBM Corporation, "Blue Logic Ethernet Family of Cores", IBM Microelectronics Division, (2001), (located at www.ibm.com/chips).
IBM Corporation, "Blue Logic High-Speed SERDES Family of Cores", IBM Microelectronics Division, (2003), (located at www.ibm.com/chips).
Notice of Allowance for U.S. Appl. No. 10/756,441 dated Jul. 29, 2008 in the United States.
Office Actioin for U.S. Appl. No. 10/756,441 dated Oct. 5, 2007 in the United States.
Notice of Allowance for U.S. Appl. No. 10/756,439 dated Aug. 8, 2007 in the United States.
Office Action for U.S. Appl. No. 10/756,439 dated Feb. 22, 2007 in the United States.
Office Action for U.S. Appl. No. 10/756,439 dated Sep. 8, 2006 in the United States.
Notice of Allowance for U.S. Appl. No. 10/756,685 dated Mar. 23, 2009 in the United States.
Notice of Allowance for U.S. Appl. No. 10/756,685 dated Nov. 28, 2008 in the United States.
Office Action for U.S. Appl. No. 10/756,685 dated Jul. 10, 2008 in the United States.
Office Action for U.S. Appl. No. 10/756,685 dated Dec. 13, 2007 in the United States.
Office Action for U.S. Appl. No. 10/756,685 dated Jun. 27, 2007 in the United States.
Notice of Allowance for U.S. Appl. No. 10/756,667 dated Jan. 28, 2009 in the United States.
Final Office Action for U.S. Appl. No. 10/756,667 dated Dec. 29, 2008 in the United States.
Office Action for U.S. Appl. No. 10/756,667 dated Jun. 12, 2008 in the United States.
Notice of Allowance for U.S. Appl. No. 10/756,600 dated Dec. 14, 2007 in the United States.
Office Action for U.S. Appl. No. 10/756,600 dated Apr. 27, 2007 in the United States.
Final Office Action for U.S. Appl. No. 10/756,600 dated Jan. 26, 2007 in the United States.
Office Action for U.S. Appl. No. 10/756,600 dated Aug. 9, 2007 in the United States.
Notice of Allowance for U.S. Appl. No. 10/756,435 dated Aug. 13, 2008 in the United States.
Notice of Allowance for U.S. Appl. No. 10/756,435 dated May 6, 2008 in the United States.
OfFice Action for U.S. Appl. No. 10/756,435 dated Nov. 15, 2007 in the United States.
Final Office Action for U.S. Appl. No. 10/756,530 dated Jul. 27, 2007 in the United States.
Office Action for U.S. Appl. No. 10/756,530 dated Apr. 2, 2007 in the United States.
Final Office Action for U.S. Appl. No. 10/756,530 dated Nov. 27, 2006 in the United States.
Office Action for U.S. Appl. No. 10/756,530 dated Jul. 25, 2006 in the United States.
Notice of Allowance for U.S. Appl. No. 10/756,529 dated Jan. 29, 2009 in the United States.
Final Office Action for U.S. Appl. No. 10/756,529 dated May 27, 2008 in the United States.
Office Action for U.S. Appl. No. 10/756,529 dated Sep. 4, 2007 in the United States.
Final Office Action for U.S. Appl. No. 10/756,529 dated Mar. 1, 2007 in the United States.
Office Action for U.S. Appl. No. 10/756,529 dated Oct. 5, 2006 in the United States.

Mike Berry, All SPI-4s Are Not Created Equal dated Feb. 20, 2003, EDN: Voice of the Electronics Engineer article, 5 pages.

Link De-Skew And Training Sequence, InfiniBand TM Architecture Release 1.0 Link/Phy Interface dated Oct. 24, 2000, vol. 2-Physical Specifications, 15 pages.

Final Office Action for U.S. Appl. No. 11/056,066 dated Apr. 21, 2008 in the United States.

Office Action U.S. Appl. No. 11/056,066 dated Nov. 27, 2007 in the United States.

Notice of Allowance for U.S. Appl. No. 11/056,472 dated Oct. 9, 2008 in the United States.

Final Office Action for U.S. Appl. No. 11/056,472 dated Jul. 17, 2008 in the United States.

Office Action for U.S. Appl. No. 11/056,472 dated Jan. 30, 2008 in the United States.

Notice of Allowance for U.S. Appl. No. 11/056,505 dated Jan. 22, 2009 in the United States.

Final Office Action for Serial No. 11/056,505 dated May 5, 2008 in the United States.

Office Action for U.S. Appl. No. 11/056,505 dated Nov. 27, 2007 in the United States.

Lynch and Thorn, Serial Channel to I/O Interface, IP.com No. IPC0M00087409D dated Jan. 1, 1977, 5 pages.

* cited by examiner

PASSING IDENTIFICATION INFORMATION

CROSS REFERENCE AND INCORPORATION BY REFERENCE

This application is related in whole or in part to the following U.S. patent application Ser. Nos. 10/756,441, 10/756,439, 10/756,685, 10/756,435, 10/756,530, 10/756,529, 10/756,667, 10/756,600, 11/056,505, 11/056,066, and 11/056,472, and cross references and, herein, incorporates by reference, in their entirety, these applications.

FIELD OF INVENTION

The present invention relates to data communications architectures for computer processors and, more particularly, to communications architectures for computer processors employing serializers and deserializers.

BACKGROUND

Computing architectures that operate efficiently and that can process data quickly are generally preferred over their counterparts. The speed at which these computing architectures process data may be limited by a number of factors that include the design of the architecture, operating conditions, quality of utilized components, and the protocols, logic, and methodologies employed by the computer architecture when processing data. Latencies in the communication of data across components arising from data communications architectures and protocols of a computing architecture may also impact the speed at which data may be processed.

A number of data communications architectures are currently employed to communicate data between cooperating components of a computer architecture (e.g. computer processors within a computing environment's processing unit or between a computer processor and peripheral component such as a data storage device). For example, IDE/ATA (Integrated Drive Electronics/Advanced Technology Attachment) and SCSI (Small Computer Systems Interface) are both common interfaces to hard drives (as well as some other devices, such as CD-ROM and DVD drives), and there are several versions of each. Other data communications architectures include PCI (Peripheral Components Interconnect), AGP (Accelerated Graphics Port), USB (Universal Serial Bus), serial data communications ports, and parallel data communications ports.

Although each of the above data communications architectures are effective in transmitting data between cooperating components, each of these architectures have drawbacks, performance limitations and may not be reliable. Specifically, such data communication architectures are not designed to handle voluminous amounts of data communications, which are communicated at high clock frequencies (e.g. several Giga Hertz). Additionally, the PCI, IDE, and SCSI data communication architectures generally require overhead processing calculations when communicating data that impacts overall data communications speed. Stated differently, in addition to the desired data being communicated additional overhead processing data must be communicated. As such, less overall data is processed during each clock cycle.

Responsive to the need for higher bandwidth data communications architectures, the SERDES (serializer/deserializer) data communications architecture was developed. SERDES operates to encode and decode data according to a predefined scheme (e.g. eight-bit/ten-bit—8b10b encoding). The encoded data is communicated over one or more communication channels from the serializer to a corresponding deserializer for decoding. The SERDES data communication architecture has been shown to increase data communications bandwidth between cooperating components. In this context, SERDES data communication architectures are deployed as data buses operating to carry data between cooperating components.

SUMMARY

A data communications architecture employing serializers and deserializers for use in communicating data between computer processing components of a computing environment to reduce latency is provided. In an illustrative implementation, a data communications architecture comprises a data interface, a serializer and a deserializer. In operation, data from computer processing components is received by the serializer. The serializer cooperating with the data interface encodes the data for communication to the deserializer according to a selected encoding protocol. Operationally, the serializer and deserializer (SERDES) cooperate to form a communications link or communications channel. The data interface, among other things, allows for the collection of data to be transferred across the link from each end of the link, provides link management and control information, encodes error protection and provides logic for processing the data across the communications channel.

Further to the exemplary implementation, the illustrative data communications architecture further comprises data buffers, a training module, a debugging module, an error injection module and an error detection module. These monitors and/or modules comprise a portion of the serializer and the deserializer. In operation, these monitors and/or modules cooperate with the data interface and instruction sets contained in the serializer and deserializer to realize functions including, but not limited to, processing debug information, processing link identification information, injecting errors across communications links, and performing error detection.

Other features of the invention are further described below.

BRIEF DESCRIPTION OF THE DRAWINGS

The data communications architecture and methods of use are further described with reference to the accompanying drawings in which.

DETAILED DESCRIPTION

Overview:

To provide the infrastructure bandwidth needed by computing environments, implementations have turned to utilizing serializers/deserializers (SERDES) point to point data communications architectures operating at high frequencies. In applying the SERDES data communications architecture to a computing environment's internal data communications infrastructure, a number of limitations come to light. In general terms, unnecessary latency in data communications arise from inefficient data communications architecture management. The management of the SERDES data communications architecture may be performed by a data interface that, among other things, collects data for communication along the SERDES communication links and provides error detection and handling instructions for errant data.

The present invention provides a data interface for use by SERDES link channels that support operations occurring bi-directionally between data communications architecture components. In an illustrative implementation, a mechanism is provided to collect data for transfer across a SERDES link from each end of the link. Additionally the mechanism may operate to provide overlay link management information, to encode error detection, and to encode the data into the proper format. The data interface of the herein described illustrative implementation also maintains logic that directs SERDES components to collect, generate, embed, and/or communicate particular types of data (e.g. error detection information, link identification information, error information, and debugging information) between SERDES link components for reliability testing and/or characterization, debugging, link training, and to check that such data is correctly collected and communicated.

The illustrative SERDES data communications architecture may also employ a data buffer to store data. In operation, the data buffer may be used to store data until correct receipt is confirmed by a response from the receiving end of a SERDES communications link. In such case, an acknowledgement may be embedded as part of data communicated between cooperating components of the SERDES data communications architecture. When an error is detected by SERDES components, the data buffer may be used to resend the data to correct the error.

Furthermore, the illustrative implementation may orchestrate the use of multiple parallel SERDES communications channels. A SERDES communications channel may comprise a logical communications link operating on a physical link (e.g. wires) between SERDES components (e.g. serializers and deserializers). When performing error detection, and other operations, the illustrative SERDES data communications architecture may employ a spare channel. Additionally, such spare channel may be used to maintain communication availability even in the event of a hard failure of one of the channels.

Figure 1:
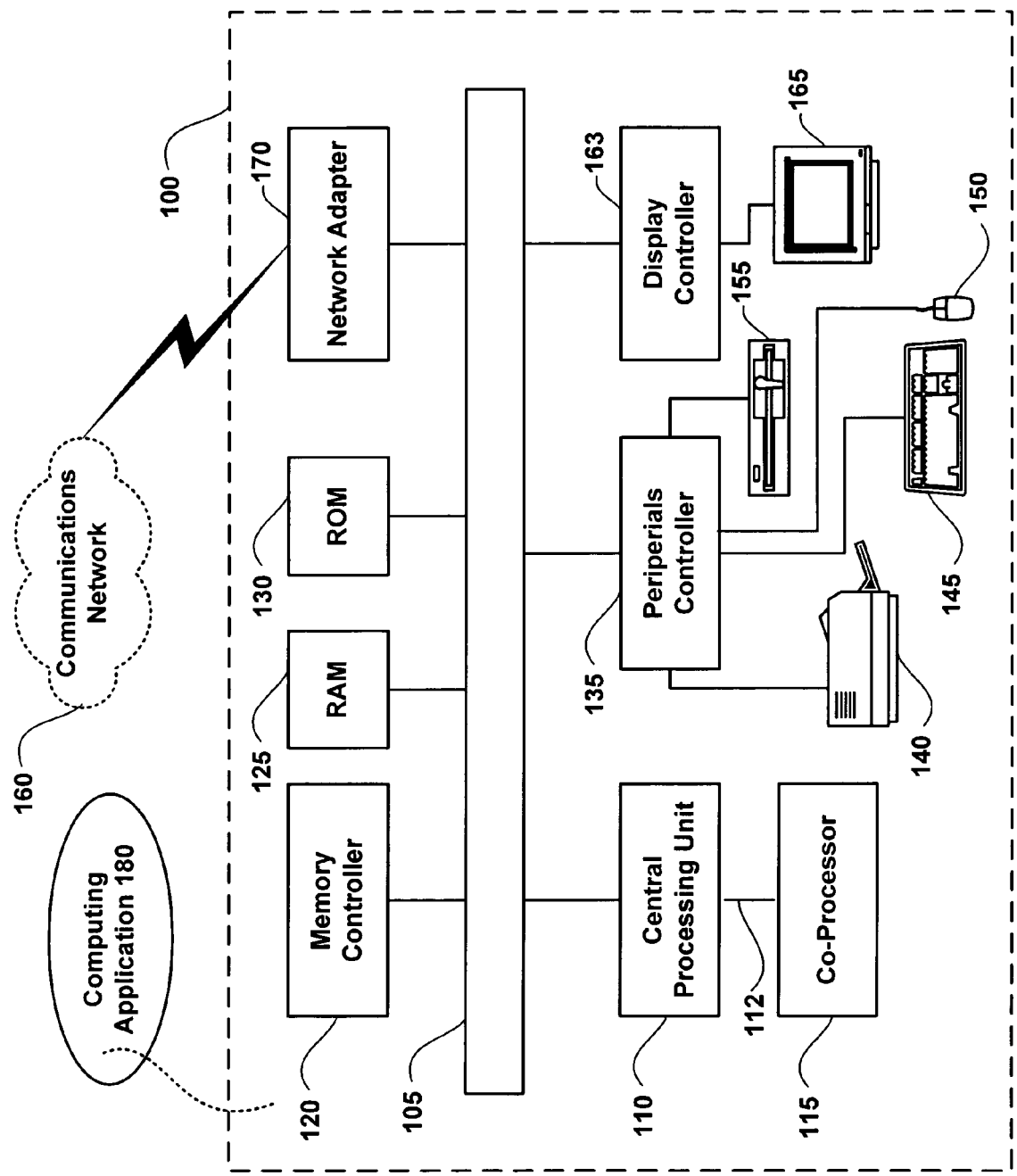
FIG. 1 is a block diagram of an exemplary computing environment in accordance with an implementation of the herein described systems and methods.

Illustrative Computing Environment:

FIG. 1 depicts an exemplary computing system 100 in accordance with herein described system and methods. Computing system 100 is capable of executing a variety of computing applications 180. Exemplary computing system 100 is controlled primarily by computer readable instructions, which may be in the form of software, where and how such software is stored or accessed. Such software may be executed within central processing unit (CPU) 110 to cause data processing system 100 to do work. In many known computer servers, workstations and personal computers central processing unit 110 is implemented by micro-electronic chips CPUs called microprocessors. Coprocessor 115 is an optional processor, distinct from main CPU 110, that performs additional functions or assists CPU 110. CPU 110 may be connected to co-processor 115 through interconnect 112. One common type of coprocessor is the floating-point coprocessor, also called a numeric or math coprocessor, which is designed to perform numeric calculations faster and better than general-purpose CPU 110.

It is appreciated that although an illustrative computing environment is shown to comprise a single CPU 110 that such description is merely illustrative as computing environment 100 may comprise a number of CPUs 110. Additionally computing environment 100 may exploit the resources of remote CPUs (not shown) through communications network 160 or some other data communications means (not shown).

In operation, CPU 110 fetches, decodes, and executes instructions, and transfers information to and from other resources via the computer's main data-transfer path, system bus 105. Such a system bus connects the components in computing system 100 and defines the medium for data exchange. System bus 105 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, computing system 100 may contain peripherals controller 135 responsible for communicating instructions from CPU 110 to peripherals, such as, printer 140, keyboard 145, mouse 150, and data storage drive 155.

Display 165, which is controlled by display controller 163, is used to display visual output generated by computing system 100. Such visual output may include text, graphics, animated graphics, and video. Display 165 may be implemented with a CRT-based video display, an LCD-based flat-panel display, gas plasma-based flat-panel display, a touch-panel, or other display forms. Display controller 163 includes electronic components required to generate a video signal that is sent to display 165.

Further, computing system 100 may contain network adaptor 170 which may be used to connect computing system 100 to an external communication network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Figure 2:
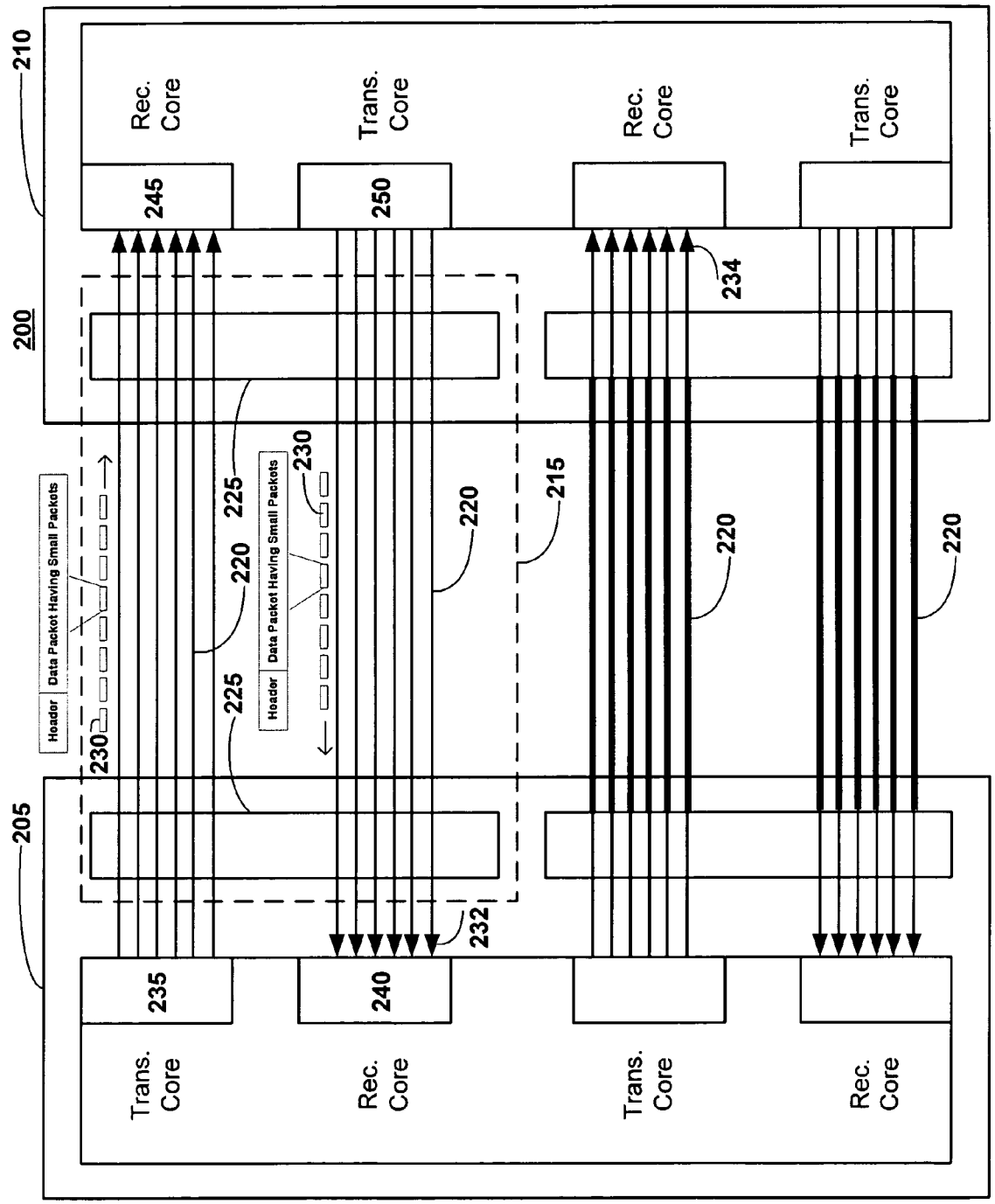
FIG. 2 is a block diagram showing the cooperation of exemplary components of an exemplary data communications architecture.
Figure 3:
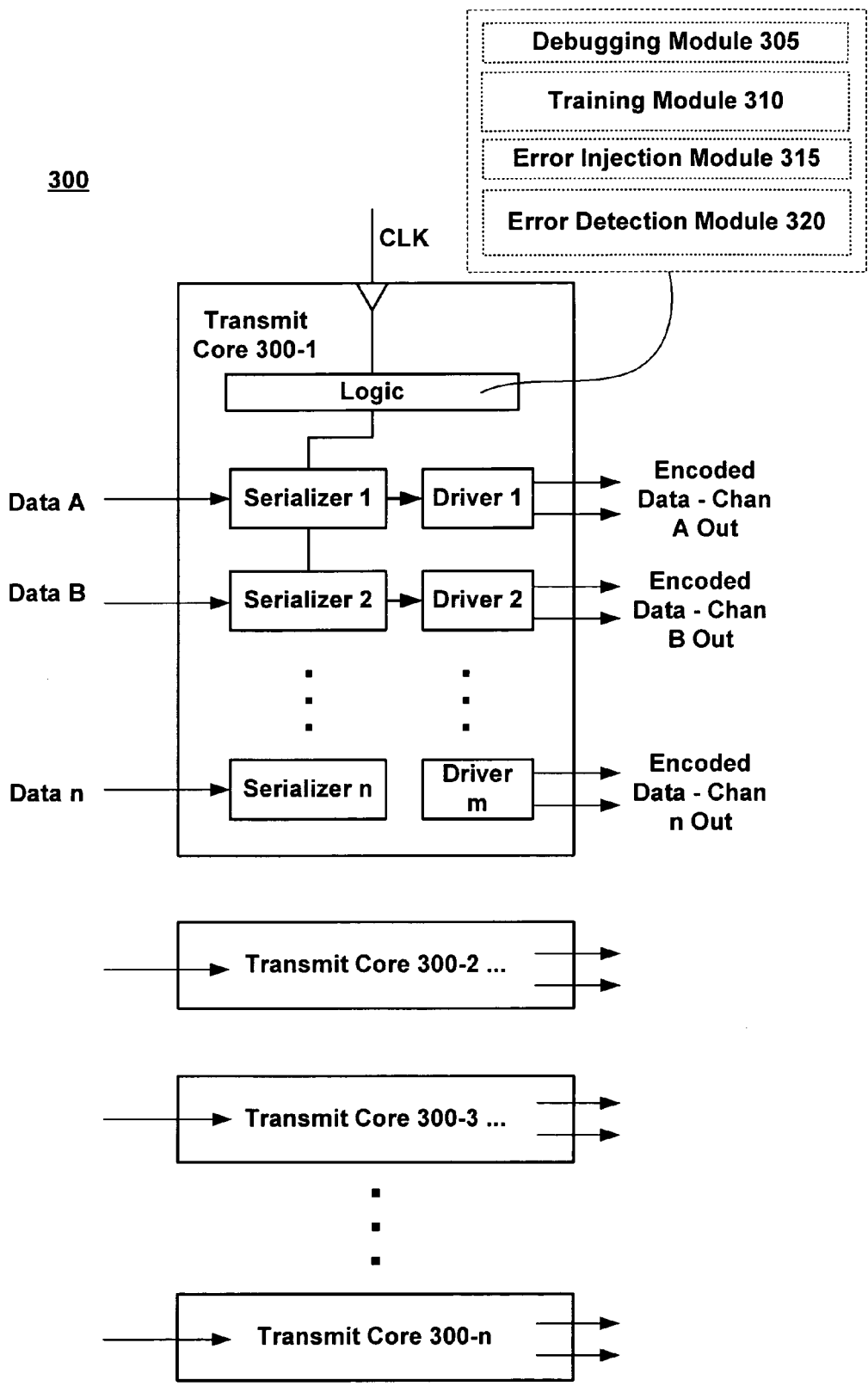
FIG. 3 is a block diagram of a transmit core in accordance with an exemplary implementation of a data communications architecture.
Figure 4:
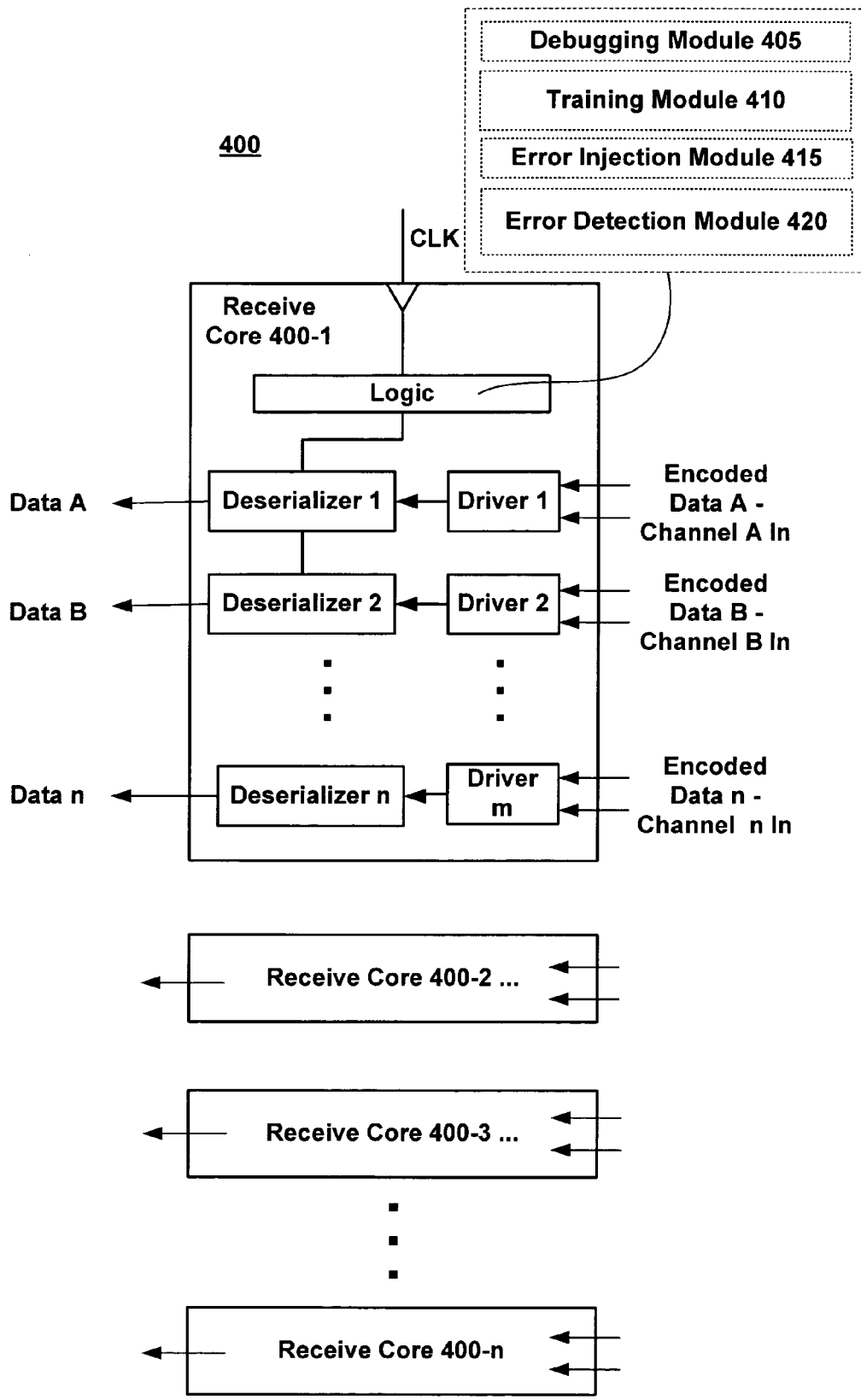
FIG. 4 is a block diagram of a receiving core in accordance with an exemplary implementation of a data communications architecture.

Data Communications Architecture:

FIGS. 2-4 depict block diagrams of an illustrative data communications architecture for use in an exemplary computing environment. The illustrative data communications architecture may be implemented as components of the computing environment and may employ SERDES components. Specifically, FIG. 2 shows a block diagram of illustrative data communications architecture 200. As is shown in FIG. 2, data communications architecture 200 comprises data communications interface modules 205 and 210 cooperating to communicate data 230 over physical links 220. Data interface communications modules 205 and 210 comprise at least one transmit core and at least one receiving core. Physical links 220 attach to data communications interface modules 205 and 210 through physical connectors 225.

In operation, exemplary computing environment (not shown) cooperates with data communications interface modules 205 and 210 to communicate data between data communications interface modules 205 and 210. In the illustrative implementation, data communication interface modules may reside in disparate geographic locations within exemplary computing environment (not shown) or may reside as part of one of exemplary computing environment's (not shown) printed circuit boards (PCB). As is shown, data may be communicated in a selected direction or bi-directionally, as indicated by the arrows 232 and 234 on physical links 220 and data 230, between transmit cores and receiving cores of data communications interfaces 205 and 210. Also, it is appreciated that physical links 220 are depicted having differing line thickness to indicate different physical link 220 media.

Furthermore, as is shown, dashed box 215 shows the components of an exemplary data communications back plane. In the implementation provided, back plane 215 is shown to have a pair of transmit-receive cores operating to communicate data. Specifically, data is processed by transmit core 235 of data communications interface 205 for communication through physical connector 225 and physical links 220 to receiving core 245 of data communications interface 210. Similarly, data may be processed for communication by transmit core 250 of data communications interface 210 to receiving core 240 of data communications interface 205. Moreover, transmit-receiving core pairs 235, 240 and 245, 250 may cooperate to form a communications channel. As a communications channel the transmit-receive core pairs may be aligned and trained to process data according to a selected encoding protocol such as eight-bit-ten-bit (8b10b) encoding.

Further, as is shown in FIG. 2, data 230 may comprise a number of packets. Specifically, data 230 may contain a header portion and data packet portion. The data packet portion may further contain small data packets. It is appreciated that in the illustrative implementation provided, a small packet may be considered a data packet that is smaller in size than a normal, full sized data packet. In operation, various data, control, training, and channel management information may be communicated over exemplary data communications architecture 200 as data 230.

FIG. 3 shows a block diagram of exemplary transmit core environment 300 depicting its components and their cooperation. As is shown in FIG. 3, exemplary transmit core environment 300 comprises a plurality of transmit cores ranging from transmit core 300-1 to transmit core 300-*n*. Transmit core 300-1 is shown to comprise logic block a plurality of serializers and drivers from serializer 1 to serializer n, and driver 1 to driver m, respectively. Additionally, transmit core 300-1 cooperates with an external data communications component (not shown) to obtain clock signal CLK. Also, as is shown, transmit core 300-1 comprises logic which maintains instruction sets to instruct the components of transmit core 300-1 (e.g. serializer 1) to perform functions in accordance with data communications operations. The logic of transmit core 300-1 may also act to maintain one or more modules and mechanisms for use during data communications operations including, but not limited to, data buffers (not shown), a debugging module 305, a training module 310, an error injection module 315 and an error detection module 320.

In operation, data is provided as input to one of transmit core 300-1's serializers. The data is encoded according to a selected encoding protocol (e.g. 8 bit-10 bit encoding) and is prepared for communication to a cooperating data communications component by one of the transmit core's drivers at one of the transmit core's output channels. The encoding protocol may employ CLK signal to encode a number of bits within a selected cycle(s) of the CLK signal. For example, Data A may be encoded by serializer 1 of transmit core 300-1 according to a selected encoding protocol and prepared for communication by driver 1 to produce Encoded Data at channel A output as per instructions provided by transmit core 300-1's logic. Similarly, Data B may be encoded by serializer 2 of transmit core 300-1 according to a selected encoding protocol and prepared for communication by driver 2 to produce Encoded Data at channel B. Such encoding process and data communication preparation is performed across the remaining serializers and drivers of transmit core 300-1 and the other transmit cores of transmit core environment 300.

FIG. 4 shows a block diagram of exemplary receiving core environment 400 depicting its components and their cooperation. As is shown in FIG. 4, exemplary receiving core 400 comprises a plurality of receiving cores ranging from receiving core 400-1 to receiving core 400-*n*. Receiving core 400-1 is shown to comprise a logic block a plurality of deserializers and drivers from deserializer 1 to deserializer n, and from driver 1 to driver m, respectively. Additionally, receiving core 400-1 cooperates with an external data communications component (not shown) to obtain clock signal CLK. Also, as is shown, receiving core 400-1 comprises logic which maintains instruction sets to instruct the components of receiving core 400-1 (e.g. deserializer 1) to perform functions in accordance with data communications operations. The logic of receiving core 400-1 may also act to maintain one or more modules and mechanisms for use during data communications operations including, but not limited to, data buffers (not shown), a debugging module 405, a training module 410, an error injection module 415 and an error detection module 420.

In operation, encoded data is provided as input to one of receiving core 400-1's deserializers. The data is decoded according to a selected decoding protocol (e.g. 10 bit-8 bit) and is prepared for communication by one of the receiving core's drivers to a cooperating data communications component at one of the receiving core's deserializer's outputs. The decoding protocol may employ a CLK signal to decode a number of bits within a selected cycle(s) of the CLK signal. For example, Encoded Data A may be decoded by deserializer 1 of receiving core 400-1 according to a selected decoding protocol and prepared for communication by driver 1 to produce Data A as per instructions provided by receiving core 400-1's logic. Similarly, Encoded Data B may be decoded by deserializer 2 of receiving core 400-1 according to a selected decoding protocol and prepared for communication by driver 2 to produce Data B. Such decoding process and data communication preparation is performed across the remaining deserializers and drivers of receiving core 400-1 and the other receiving cores of transmit core environment 400.

Taken together FIG. 3 and FIG. 4 describe an exemplary communications channel environment such that data is encoded for communication by one or more transmit cores for decoding and subsequent processing by one or more receiving cores. Although described as separate components, it is appreciated that transmit cores and receiving cores may reside on a single communications component (see data communications interface 205 of FIG. 2). Moreover, transmit cores and receiving cores may operate as pairs to form one or more bi-directional data communications channels.

Figure 5:
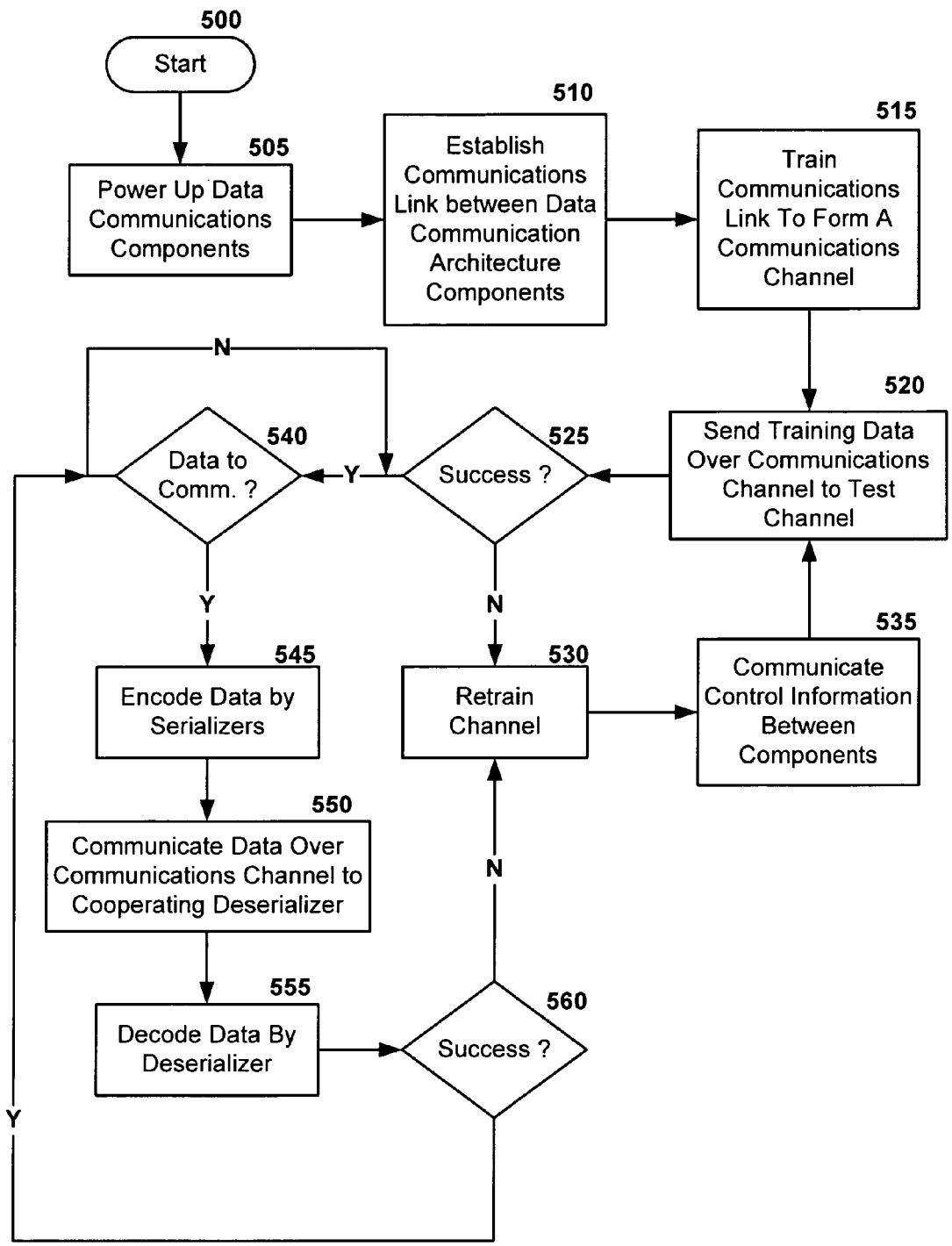
FIG. 5 is a flowchart diagram showing the processing performed by an exemplary data communications architecture when communicating data.

Communicating Data Across Communications Links:

FIG. 5 shows the processing performed by exemplary data communications architecture 200 when establishing a communications channel. As is shown, processing begins at block 500 and proceeds to block 505 where the communications components are powered up for operation. From there, processing proceeds to block 510 where communications links are established between the data communication architecture components. The communications links are then trained at block 515 to form a communications channel. Training data is then sent over the communications channel at block 520 to test the communications channel. A check is then performed at block 525 to determine if the communications channel test was successful. If it was successful, processing proceeds to block 540 where a check is performed to determine if there is stream of data to communicate over the successfully tested communications channel. If at block 540 it is determined that there is no data to communicate, processing reverts to the input of block 540. However, if there is a stream of data to communicate over the successfully tested and trained communications channel, processing proceeds to block 545 where the stream of data is encoded by serializers. The encoded stream of data is then communicated over the communications channel to cooperating deserializers at block 550. The stream of data is then decoded by the deserializers at block 555. A check is then performed at block 560 to determine if each small data packet of the stream of data was successfully communicated. If the small data packet was successfully transmitted, processing reverts to block 540 and proceeds there from. However, if the small data packet was not successfully communicated, processing reverts back to block 530 where the communications channel is retrained and continues from there.

However, if at block 525 it is determined that the communications channel test was not successful, processing proceeds to block 530 where the communications links are retrained. From there processing proceeds to block 535 where control information is communicated between the communications link components. From there, processing reverts to block 520 and proceeds there from.

In operation, the illustrative implementation provides that the training sequence is governed by the deserializers of a communications link. Specifically, initial training is deemed completed upon the recognition of an indication of the writing of a selected software type register on the deserializer. At such time, data is driven onto the link by the serializers of the communications channel. In the context of deserializer operations, the deserializers maintain one or more instructions sets which direct the deserializers to detect activity on the link to signal cooperating serializers to begin initialization. The deserializers and serializers of the communications channels maintain at least one instruction set to direct the channels to power up. Upon successful power up, a per channel self test is performed from which the results are collected and compared. The instruction set then directs the serializers and deserializers to communicate a selected data pattern which is expected by the deserializers which allow the deserializers to determine bit units grouping for use by the encoding and decoding protocols utilized by the serializers and deserializers.

Additionally, a second recognizable data pattern is communicated to the deserializers which the deserializers attribute as the small packet data communications. By setting the small packet data communications the deserializers can operate to match small packets together in groupings consistent with how the small packets were originally communicated. Once the second data pattern is successfully communicated and processed, a control signal is sent from the deserializers to the serializers of the communications links indicating that training has been completed. At this point data packets may be communicated across the trained channels.

Moreover, the illustrative implementation provides that should an error occur over the communications link, the link may perform a retraining process. Link retraining is similar to the above-described link training outside of foregoing the powering up the communication channel components. Retraining may be triggered by a number of events, including but not limited to, the recognition of an error across the communications link or by reception of an error signal on the link generated by the receiving end of the communications link.

Debug Operations:

Exemplary data communications architecture 200 of FIG. 2 is also capable of passing debug data for processing and analysis. In the context of a SERDES data communications architecture, more visibility into the internal design of the exemplary data communications architecture can translate into more efficient debug and validation of the SERDES data communications architecture design and implementation. In the SERDES data communications architecture, during debug operation, debug data is routed across the various components of the architecture for processing and analysis. Proper staging and off-loading of the debug information occurs when the debug data is successfully propagated across the architecture.

In the implementation provided, the debug data may originate from an internal debug data hardware component comprising a portion of either of the transmit core (300 of FIG. 3) or receiving core (400 of FIG. 4). The debug data is processed according to one or more instruction sets to propagate the debug data among the cooperating components of the exemplary communications architecture. In the implementation provided the exemplary architecture may receive debug data having a first selected number of bits and pair such debug data to create a modified debug data (e.g. debug data packet) having a second selected number of bits. The paired debug data may then be buffered to match it to a communication link frequency and then communicated across the communication link. On the receiving end, the paired debug data may be captured and decomposed to a data packet having the first selected number of bits.

Included in the debug operations may be the capability by the receiving end of an exemplary communications link of the exemplary communications architecture to collect regular non-debug transactions of the link and provide all, or part, of the non-debug transactions to the internal debug logic for subsequent communication (e.g. transaction data repeated on a different exemplary outbound link of the exemplary communications architecture). In doing so, the debug logic contributes to more efficient processing and communication of data across the exemplary data communications architecture.

Additionally, the illustrative implementation provides that the transmit end of the communications link may either pair alternating cycles of the internal debug data hardware component as a debug data packet, or it may utilize a valid indication sent along with the debug data to match up debug data being forwarded from a cooperating data communications architecture component (e.g. a link port). Furthermore, the illustrative implementation provides that the exemplary data communications architecture may enter debug operations through the initiation of a link retraining. Upon completion of the link training sequence, debug operations proceed.

Figure 6:
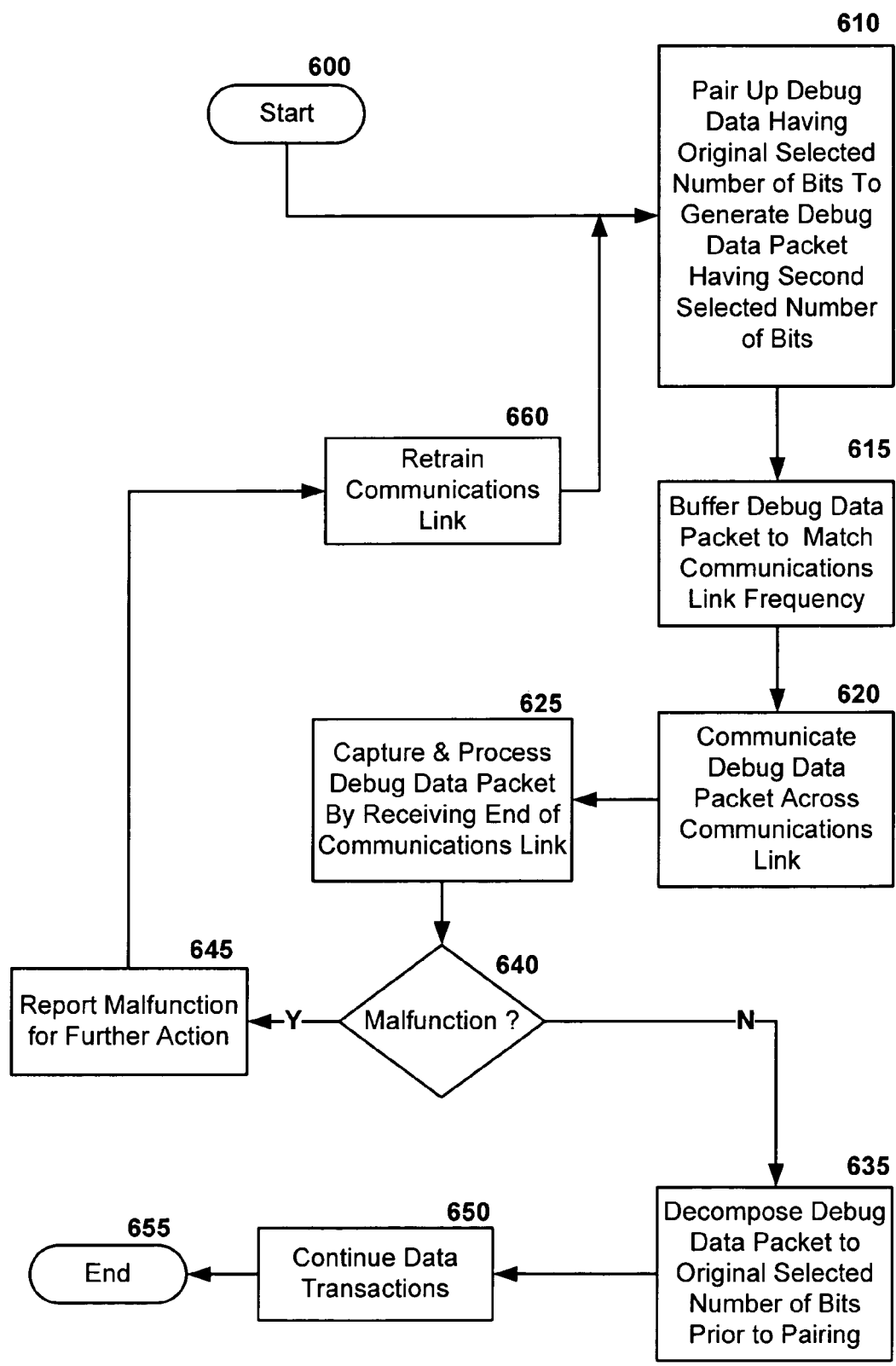
FIG. 6 is a flowchart diagram showing the processing performed by an exemplary data communications architecture when handling debug information.

FIG. 6 shows the processing performed by exemplary data communications architecture 200 when handling debug data. As is shown, processing begins at block 600 and proceeds to block 610 where the debug data, having an original selected number of bits (e.g. 76 bits), is paired up to generate a debug data packet having a second selected number of bits (e.g. 152 bits). From there, the debug data packet is buffered to match it up to the communications link frequency at block 615. The debug data packet is then communicated across the communications link at block 620. From there the debug data packet is captured and processed at the receiving end of the communications link at block 625.

A check is then performed at block 640 to determine if there are link malfunctions. If the check at block 640 indicates a link malfunction, processing proceeds to block 645 where the malfunction is reported for further action. Processing then proceeds to block 660 where the communications link is retrained. From there processing reverts to block 610 and continues from there.

However, if at block 640 it is determined that there are no link malfunctions, processing proceeds to block 635 where the debug data packet is decomposed to put in a form where the debug data has its original number of selected bits. From there, processing proceeds to block 650 to continue with data transactions. Processing then terminates at block 655.

Link Identification Information:

Exemplary data communications architecture 200 is also capable of passing link identification information. The illustrative implementation operates to allow for the confirmation, validation, and mapping of the physical communications links of exemplary communications data architecture 200 through the use of link identification information.

In the context of a SERDES data communications architecture, several links are used together for each point to point connection within the exemplary data communications architecture. In the illustrative implementation, the communication nodes of a SERDES data communications architecture may be connected into crossbar hardware components which facilitate the communication of data across a SERDES data communications architecture. These physical connections direct and dictate the operation of the exemplary data communications architecture. To ensure that these connections are correct, and/or to build a mapping of the connections, knowledge about the connections is required.

The illustrative implementation provides that the communications links of the exemplary data communications architecture may be trained prior to use. During training, among other things, the exemplary data communications architecture, identifies the placement of the clocks of the various cooperating components of the data communications architecture. Using the clock position information, data packets may be aligned from the transmitting end to the receiving end of the communications link ensuring cohesive data communications.

The illustrative implementation further provides that, in operation, a location identifier is generated and communicated from the transmitting end of an exemplary communications link to the receiving end of the communications link providing location (e.g. mapping and connection) information about the transmitting end of the communications link. In the illustrative implementation, the location identifier may be embedded in the training sequence at some selected interval or training step but prior to the link being released for normal operation. The embedded location identifier is captured by the receiving end as per the receiving end's logic (e.g. instructions sets and commands), during the training sequence, placing the location identification signal in a storage component for subsequent processing. In this context, the exemplary data communications architecture may utilize one or more instruction sets to process the location identification information (e.g. through the use of internal or external software) to generate a topology of the data communication architecture connections and connection relationships.

Specifically, the data pattern (e.g. location identifier) to be passed through the transmitting end of the communications link may be hard-wired by hardware logic and/or be programmable via an instruction set (e.g. software) or may be provided by external sources such as cooperating hardware components. The illustrative implementation provides that the location identifier data field may be of the programmable kind loaded into the receiving end by shifting in the data pattern (e.g. location identifier) from an external input communications port that may be driven by one or more field programmable gate arrays (FPGA) (not shown). In being of the programmable type, the data pattern may include additional information about the physical connection beyond just location, including but not limited to, hardware type (e.g. chip type), link frequency and link status. In the context of status information, such information may include, but is not limited to, reset progress, port status, configuration information or error status.

Figure 7:
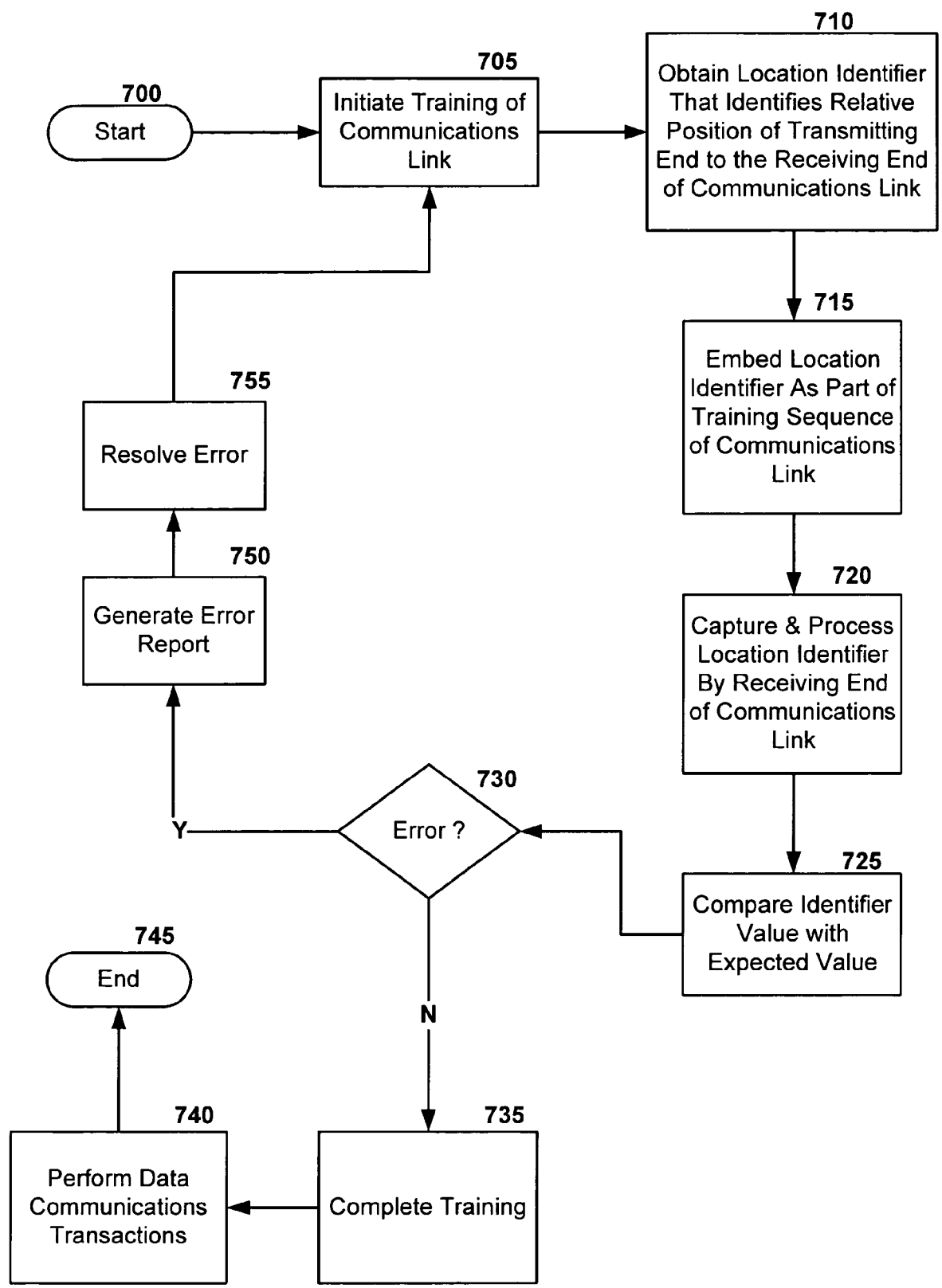
FIG. 7 is a flowchart diagram showing the processing performed by an exemplary data communications architecture when handling identification information.

FIG. 7 shows the processing performed by exemplary data communications architecture 200 when passing link identification information. As is shown, processing begins at block 700 and proceeds to block 705 where data communications architecture initiates training of the communications link.

From there processing proceeds to block 710 where a location identifier is obtained that identifies the relative position of the transmitting end to the receiving end of an exemplary communications link. At block 715 the location identifier is embedded as part of the training sequence of the communications link. Processing then proceeds to block 720 where the location identifier is captured ad processed by the receiving end of the communications link. The location identifier value is compared with an expected value at block 725 by the receiving end of the communications link.

A check is then performed at block 830 to determine if there were any errors in the transmission of the location identifier. If there were no errors determined at block 830, processing proceeds to block 735 where training is completed and data transactions performed at block 745.

However, if at block 730 it is determined that there were errors, processing proceeds to block 750 where the error is reported. The errors are then resolved at block 755. From there, processing proceeds to block 705 and continues from there.

Error Injection:

Exemplary data communications architecture 200 of FIG. 2 is also capable of injecting selected errors as part of communications link test. In the context of a SERDES data communications architecture, the illustrative implementation validates error case functionality in a system under evaluation (e.g. testing of a communications link).

SERDES data communications architectures provide for several different correctness checks of the data received at the receiving end of a communications link. Different actions are expected based on the nature of the error, and different information can be expected at the receiving end of the communications link. The illustrative implementation specifies a variety of injected error events triggered by a signal from the debug logic (e.g. 315 of FIG. 3) found on the transmitting end of the communications link. For example such error events may include, but are not limited to, simple single bit errors, skipping or adding a small data packet, and turning off a communications link channel.

Additionally, the illustrative implementation provides for more than one error to be injected as part of a test sequence. In this context, a subsequent error may be injected so that it occurs simultaneously with the first error, or when a second trigger occurs. With such capability multiple error events are capable of being tested. Additionally, the illustrative implementation may allow for the specification of the duration of each error type. This may be from one to several cycles, or permanent (e.g. until the condition is cleared off the communications link). As such the illustrative implementation is capable of handling of both sporadic and stuck-at type failures. Moreover, the illustrative implementation may capture the corrupted small data packets in a buffer (e.g. 300 of FIG. 3) on the transmit end of the communications link when an error trigger occurs. In doing so, a reference may be created to compare to the captured error logs at the receiving end of the link to confirm expected communications link behavior.

Figure 8:
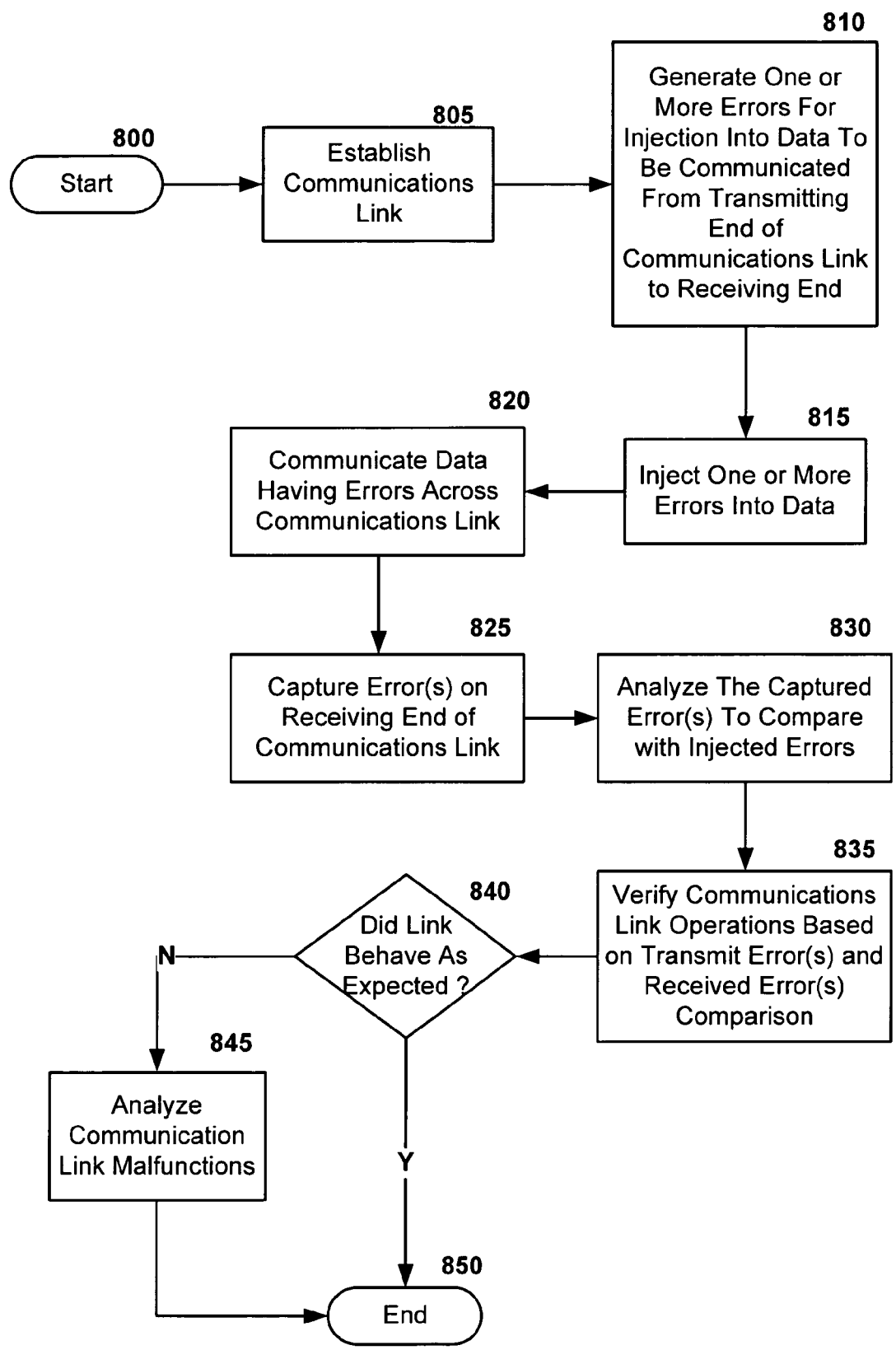
FIG. 8 is a flowchart diagram showing the processing performed by an exemplary data communications architecture when injecting errors as part of a link test.

FIG. 8 shows the processing performed by exemplary data communications architecture 200 of FIG. 2 when injecting errors as part of a communications link test. As is shown, processing begins at block 800 and proceeds to block 805 where a communication link is established. From there, processing proceeds to block 810 where one or more errors (e.g. stall, time lapse, incorrect small data packet, etc.) are generated for injection into data to be communicated from the transmitting end to the receiving end of the communications link. Processing then proceeds to block 815 where the generated errors are injected into the data. The modified data is then communicated across the communications link at block 820. The error(s) are then captured on the receiving end of the communications link at block 825. The captured errors are then analyzed to compare with original injected errors at block 830. Based on the comparisons, the communications link operation is verified at block 835. A check is then performed at block 840 to determine if the link is behaving as expected. If the check at block 840 indicates that the communications link is behaving as expected, processing terminates at block 850.

However, if at block 840 it is determined that the link is behaving incorrectly, processing proceeds to block 845 where the communications link malfunctions are analyzed. From there, processing terminates at block 850.

Error Detection:

Exemplary data communications architecture 200 of FIG. 2 is also capable of efficiently detecting errors in data communication transactions without introducing latency into the communications link. In the context of a SERDES data communications architecture, the illustrative implementation is capable of retrying data transfers that fail to accurately pass across a SERDES communications link.

In SERDES data communications architectures, data packets may be tracked and monitored to determine successful transmission. In this context, the tag of selected small data packet that cross the link are monitored to determine successful transmission from the transmitting end of the communications link to the receiving end of the communications link. Upon successful transmission, an acknowledgement message may be sent from the receiving end of the communications link to the transmitting end of the communications link to indicate a successful transmission. As described previously, transactions may be sent across the communications link as a sequence of small data packets: one header small data packet with routing and transaction and transaction type information followed by as many additional sequence of small data packets as are necessary to complete the data transfer. In the illustrative implementation, the header may include the current small data packet tag.

In operation, the receiving end of the link checks the tag included in the header packets and flags a link error if the expected tag is not found. As such, an error due to a dropped or repeated small data packet will be discovered when the next small data packet expected to be a header does not have the correct tag. However, inefficiencies may result as an error may not be detected until the full transaction is completed.

The illustrative implementation provides the capability of including bits of the implied tag into the parity field(s) used to protect the small data packets for bit errors. In operation, the bits of the tag are included in a different one of the parity bits calculated to detect bit errors. As such, lost or repeated small data packets will result in a parity calculation error on the receiving end of the communications link. The illustrative implementation, upon detecting a parity error, may request the retransmission of the small data packet and may also prevent corrupted data from being forwarded from the receiving end of the communications link.

Figure 9:
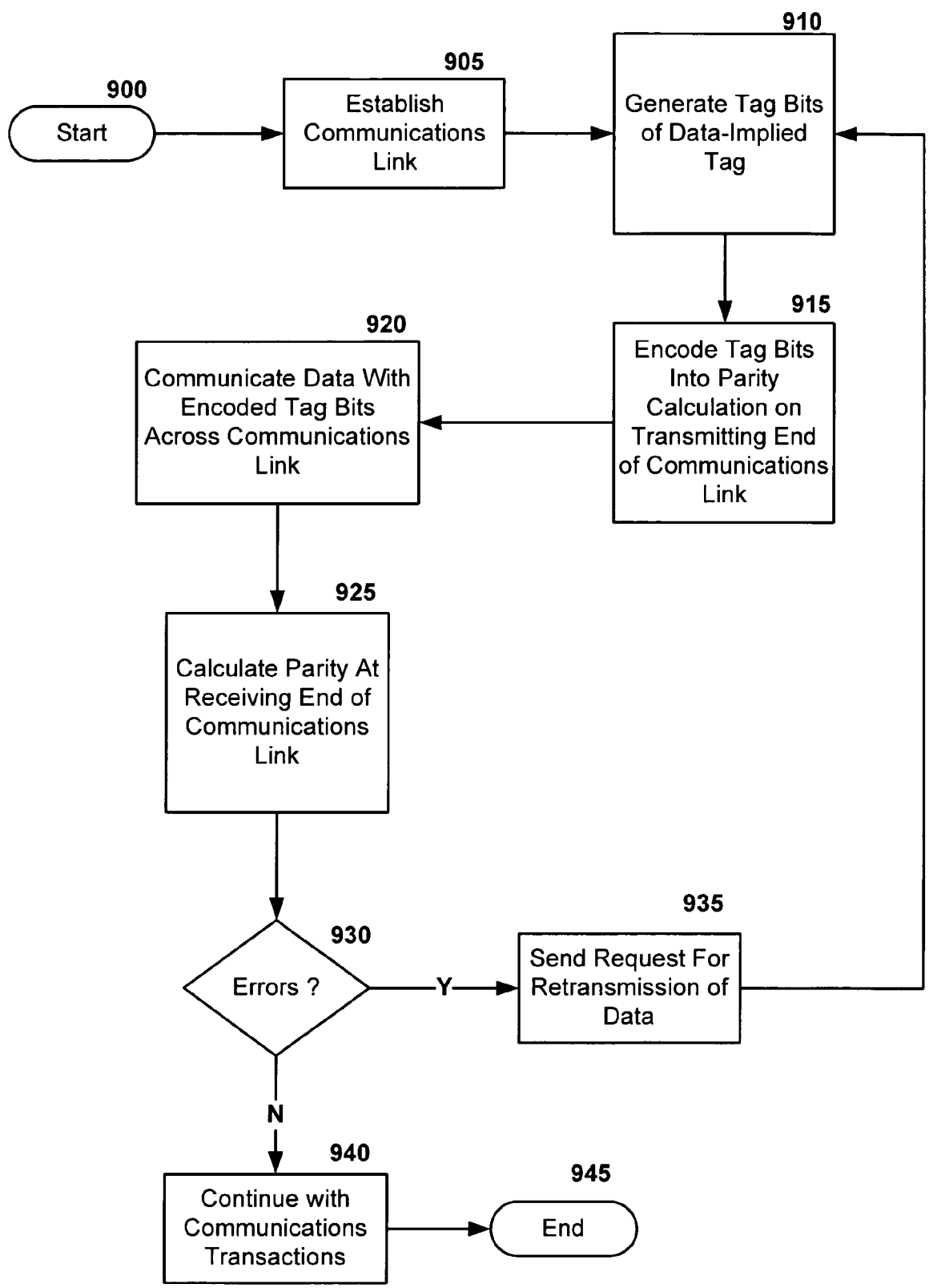
FIG. 9 is a flowchart diagram showing the processing performed by an exemplary data communications architecture when handling error detection.

FIG. 9 shows the processing performed by exemplary data communications architecture 200 of FIG. 2 when detecting errors in data communications transactions. As is shown, processing begins at block 900 and proceeds to block 905 where a communications link is established. From there processing proceeds to block 910 where the tag bits of the data-implied tag are generated. The generated tag bits are then encoded (e.g. calculate eight parity bits across the channels carrying data wherein each parity bit is based off the 1, 2, 3, . . . $8^{th}$ bit of the 8 bits of data sent on a communications link) into the parity bit calculation on the transmitting end of the communications link at block 915. From there, processing proceeds to block 920 where the data having the encoded tag bits as part of the parity bits is communicated across the communications link. The data is received at the receiving end of the communications link and the parity of the data is calculated by the receiving end at block 925. A check is then performed at block 930 to determine if there are any errors in the transmitted parity calculation and the received parity calculation. If at block 930 it is determined that there are no errors, processing proceeds to block 940 where the data communications transactions continue. Processing then terminates at block 945.

However, if at block 930, it is determined that there are errors processing proceeds to block 940 where a request for the retransmission of data is sent by the receiving end of the communications link to the transmitting end of the communications link. Processing then reverts back to block 910 and continues from there.

In sum, the herein described apparatus and methods provide a data communication architecture employing for use as a computing environments communication fabric that reduces data latency. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A system to identify components of a data communications architecture comprising:
a training module operative to configure the components of the data communications architecture according to a training sequence;
a location identifier comprising a portion of the training sequence indicative of the physical and virtual location of at least a first component of the data communications architecture relative to a second component of the data communication architecture; and
a communications link having a transmitting end and a receiving end operative to communicate the location identifier across the components of the data communications architecture;
wherein one of the transmitting end and the receiving end includes the first component and the other of the transmitting and the receiving end includes the second component.

2. The system as recited in claim 1 further comprising at least one instruction set to provide directions to the training module to embed the location identifier as part of the training sequence.

3. The system as recited in claim 2 wherein the communications link comprises any of a serializer and a deserializer.

4. The system as recited in claim 3 wherein the training module comprises a portion of the serializer.

5. The system as recited in claim 4 wherein the training module comprises a portion of the deserializer.

6. The system as recited in clam 1 wherein the location identifier is generated at a transmitting end of the communications link.

7. The system as recited in claim 1 wherein the location identifier communicated across the communications link is captured at a receiving end of the communications link.

8. The system as recited in claim 7 wherein the captured location identifier is compared at the receiving end of the communications link to a selected value.

9. The system as recited in claim 8 wherein the receiving end of the communications link comprises a set of expected values provided at the training module to identify an error.

10. The system as recited in claim 9 further comprising an instruction set providing directions to the receiving end of the communications link to handle an identified error.

11. The system as recited in claim 10 wherein the receiving end of the communications link generates a report when an error is identified.

12. A method for identifying components of a data communications architecture comprising:
creating a location identifier representative of the physical and virtual location of a first component of the data communications architecture relative to a second component of the data communications architecture;
embedding the location identifier as part of a training sequence applicable to a communications link of the data communications architecture, said communications link having a transmitting end and a receiving end; and
communicating the location identifier across the data communications architecture;

wherein one of the transmitting end and the receiving end includes the first component and the other of the transmitting and the receiving end includes the second component.

13. The method as recited in claim 12 further comprising capturing the communicated location identifier at a receiving end of the communications link.

14. The method as recited in claim 13 further comprises generating at the receiving end of the communications link at least one expected value representative of the component configuration.

15. The method as recited in claim 14 further comprising comparing the captured location identifier against the generated configuration value at the receiving end of the communications link to identify an error.

16. The method as recited in claim 15 further comprising generating an error report when an error is identified at the receiving end of the communications link.

17. The method as recited in claim 16 further comprising when an error is identified, initiating at least one corrective action to resolve the identified error.

18. The method as recited in claim 13 further comprising initiating the communications link.

19. The method as recited in claim 13 further comprising providing at least one instruction set to a transmitting end of the communications link to participate in the creation of the location identifier.

20. The method as recited in claim 13 further comprising providing at least one instruction set to a transmitting end of the communications link to embed the location identifier as part of the training sequence.

21. A computer readable medium having computer readable instructions to instruct a computer to perform a method comprising:
   creating a location identifier representative of the physical and virtual location of a first component of the data communications architecture relative to a second component of the data communication architecture;
   embedding the location identifier as part of a training sequence applicable to a communications link of the data communications architecture, said communications link having a transmitting end and a receiving end; and
   communicating the location identifier across the data communications architecture;
   wherein one of the transmitting end and the receiving end includes the first component and the other of the transmitting and the receiving end includes the second component.

22. A system to pass location identification information to identify the configuration of components of a SERDES communications link having at least a transmitting end and a receiving end comprising:
   a first means for creating a location identifier indicative of the physical and virtual location of a first SERDES communications link component relative to a second SERDES communications link component;
   a second means for embedding the location identifier as part of a training sequence applicable to the SERDES communications link; and
   a third means for communicating the location identifier between the first and second components of the SERDES communications link;
   wherein one of the transmitting and the receiving end includes the first SERDES communications link component and the other of the transmitting and the receiving end includes the second SERDES communications link component.

23. The system as recited in claim 22 further comprising a fourth means to capture the communicated location identifier at a receiving end of the SERDES communications link.

24. The system as recited in claim 23 further comprising a fifth means to compare the captured communicated location identifier with an expected value at the receiving end of the communications link.

25. A method for passing identification information of SERDES communications link components across a data communications architecture comprising:
   initiating a training sequence of a SERDES communications link having at least a transmitting end and a receiving end;
   generating at the transmitting end of the SERDES communications link a location identifier representative of the virtual and physical location of a first component of the SERDES communications link relative to a second component of the SERDES communication link;
   embedding the generated location identifier as part of the training sequence;
   communicating the generated location identifier across the SERDES communications link to the receiving end of the SERDES communications link;
   capturing the generated location identifier at the receiving end of the SERDES communications link;
   comparing the captured location identifier at the receiving end of the SERDES communications link against an expected value; and
   identifying errors between the captured location identifier and the expected value;
   wherein one of the transmitting end and the receiving end includes the first component and the other of the transmitting and the receiving end includes the second component.

26. The method as recited in claim 25 further comprising providing at least one instruction set to the transmitting end of the SERDES communications link having directions to generate the location identifier.

27. The method as recited in claim 25 further comprising providing at least one instruction set to the transmitting end of the SERDES communications link having directions to embed the location identifier.

28. The method as recited in claim 25 further comprising providing at least one instruction set to the receiving end of the SERDES communications link having directions to capture the generated location identifier.

29. The method as recited in claim 25 further comprising providing at least one instruction set to the receiving end of the SERDES communications link having directions to compare the generated location identifier with the expected value.

30. A computer readable medium having computer readable instructions to instruct a computer to perform a method comprising:
   initiating a training sequence of a SERDES communications link having at least a transmitting end and a receiving end;
   generating at the transmitting end of the SERDES communications link a location identifier representative of the virtual and physical location of a first component of the SERDES communications link relative to a second component of the SERDES communications link;
   embedding the generated location identifier as part of the training sequence;

communicating the generated location identifier across the SERDES communications link to the receiving end of the SERDES communications link;

capturing the generated location identifier at the receiving end of the SERDES communications link;

comparing the captured location identifier at the receiving end of the SERDES communications link against an expected value; and identifying errors between the captured location identifier and the expected value;

wherein one of the transmitting end and the receiving end includes the first component and the other of the transmitting and the receiving end includes the second component.

* * * * *

UNITED STATES PATENT AND TRADEMARK OFFICE
CERTIFICATE OF CORRECTION

| | | |
|---|---|---|
| PATENT NO. | : 7,624,213 B2 | Page 1 of 1 |
| APPLICATION NO. | : 11/056471 | |
| DATED | : November 24, 2009 | |
| INVENTOR(S) | : Gregg Bernard Lesartre et al. | |

It is certified that error appears in the above-identified patent and that said Letters Patent is hereby corrected as shown below:

In column 11, line 11, delete "830" and insert -- 730 --, therefor.

In column 11, line 13, delete "830," and insert -- 730, --, therefor.

In column 11, line 15, delete "745." and insert -- 740. --, therefor.

Signed and Sealed this

Ninth Day of February, 2010

David J. Kappos
*Director of the United States Patent and Trademark Office*